US005784599A

United States Patent [19]
Elkhoury

[11] Patent Number: 5,784,599
[45] Date of Patent: Jul. 21, 1998

[54] METHOD AND APPARATUS FOR ESTABLISHING HOST BUS CLOCK FREQUENCY AND PROCESSOR CORE CLOCK RATIOS IN A MULTI-PROCESSOR COMPUTER SYSTEM

[75] Inventor: Bassam N. Elkhoury, Spring, Tex.

[73] Assignee: Compaq Computer Corporation, Houston, Tex.

[21] Appl. No.: 572,957

[22] Filed: Dec. 15, 1995

[51] Int. Cl.$^6$ .................................................... G06F 1/04
[52] U.S. Cl. ........................................................ 395/556
[58] Field of Search .................................. 395/555, 556

[56] References Cited

PUBLICATIONS

Intel® Pentium® Pro Family Developer's Manual vol. 1: Specification, p. 9–9 to 9–10; 11–5 to 11–7; 11–19, Jan. 1996.
National Semiconductor, National Clock Generation and Support Design Databook, pp. 3–73 to 3–81 and 3–95 to 3–99, 1995.

Primary Examiner—Thomas M. Heckler
Attorney, Agent, or Firm—Pavel, Hewitt, Kimball & Krieger

[57] ABSTRACT

A method for setting host bus clock frequencies and processor core clock ratios in a multi-processor computer system. The method first determines original host bus frequency settings for each of the installed processors. The host bus is set to clock at the slowest of the frequency settings. Processor core clock ratios are then optimized for the new host bus frequency. The optimization process commences by determining the original processor core clock ratio settings for each processor. These ratio settings are individually optimized via an iterative process wherein the core clock ratios are incrementally increased and multiplied by the new host bus frequency. This process continues until the incremented core clock ratio yields a core clock frequency in excess of the maximum rating for the processor under test. The core clock ratio is then decremented and latched into the processor under test via a hard reset. Establishing core clock ratios based on the slowest host bus frequency setting insures that all processors can functionally coexist on a shared host bus and still perform in an optimal manner.

13 Claims, 9 Drawing Sheets

8
METHOD AND APPARATUS FOR ESTABLISHING HOST BUS CLOCK FREQUENCY AND PROCESSOR CORE CLOCK RATIOS IN A MULTI-PROCESSOR COMPUTER SYSTEM

SPECIFICATION

1. Field of the Invention

The present invention relates in general to a computer system having multiple processors, and more particularly to a method for setting host bus clock speeds and microprocessor core clock ratios according to the slowest detected host bus configuration.

2. Background of the Invention

Continuing increases in performance versus hardware price ratios have led to changes in both technical and office computing environments. Distributed workstation-server networks are displacing the once pervasive terminals attached to mainframes. In a computer network, each individual user's workstation is referred to as a client computer, while the machine that provides for shared resources such as printers, file storage and communication services is referred to as a file server or simply "server". The server has a mass storage device, typically a magnetic hard disk, that is connected to a network and is accessible to multiple users over the network. The information typically stored in such a system consists of binary computer data such as executable programs and corresponding data.

The server and client computers are connected via a local area network (LAN). Client and server computers are all considered nodes in the network. Client nodes use standard communications protocols to exchange service requests and responses with server nodes. When each client computer is running an operating system such as MS-DOS, and the number of client computers is small, the work load on the server is also small and a relatively slow server will suffice. However, the increase in client workstation performance by more than a factor of ten in the last few years has enabled more powerful application software to be used. This software can have ravenous appetites for data from the LAN. Further, client computers running multitasking operating systems such as UNIX, Windows 95, or Windows NT are capable of sending multiple requests concurrently, generating an increased workload on the server. As such, the increased performance requirements on the host server become significant.

One solution to solving the server "bottleneck" involves incorporating a plurality of high speed processors in the server, with each processor typically having its own cache memory for data and instruction storage. These processors are connected to a common bus with a system memory and a disk controller. The processors are typically advanced 32-bit processors such as the Pentium™ or Pentium Pro™ (P6) microprocessors from Intel Corporation. Additionally, the system typically has one or more expansion buses which accept I/O expansion cards. These I/O expansion cards provide a multitude of I/O operations in response to requests from client workstations.

At present, high end servers typically offer at least one Peripheral Component Interconnect (PCI) bus for accepting add-on I/O cards. The PCI bus is a physical interconnect standard intended for use between peripheral controller components and processor/memory systems. The PCI bus serves as a standard interface at the component level in much the same way that ISA, EISA, or Micro-Channel buses are standard interfaces at the board level. This bus standard flexibly supports a plurality of configurations, including any number of secondary PCI buses attached to the primary PCI bus through PCI bridges. Each secondary PCI bus could also have any number of tertiary PCI buses attached through additional PCI bridges.

There are many frequencies that have an impact on multi-processor system architecture, particularly including the CPU core clock frequency—the speed at which the CPU operates internally; and the CPU bus (or "host bus") frequency—the speed at which the CPU communicates with the rest of the system. The CPU's core clock is usually generated from the host bus clock by on-chip circuitry, with the ratio being established following a hard system boot. Typically, the core clock frequency is substantially higher than the host bus frequency. This difference can be attributed to limitations in the on-chip interface circuitry between the core logic and host bus. Efforts are underway to speed up the host bus, but with the larger loads that must be driven by host bus signals, core frequencies are likely to remain higher for the foreseeable future.

One of the key design challenges in developing logic to support the P6 and other processors with sped up core clocks is accommodating the many possible high-end server configurations without sacrificing performance. In current multi-processor systems, modular CPU cards incorporating two processors are typically used. A representative system might include two such cards, for a total of four processors. The processors are connected via a shared host bus.

Upgradability is a desired feature in server systems, and often provides the user with the option of using different processor versions characterized at different maximum clock frequencies. Use of a common host bus creates problems in situations where the upgrade is partial. Consider a relatively fast P6 paired with a slower version P6 on a CPU card: if the host bus clock frequency is set according to the fastest processor, the remaining processors may not function properly. However, if the host bus clock frequency is decreased to accommodate the slowest processor, the full computational potential of the other processors may not be realized. Thus, there are problems in systems incorporating processors with distinct clock frequency specifications.

SUMMARY OF THE INVENTION

The present invention provides a method for optimizing the host bus clock frequency and CPU core clock ratio settings in a multi-processor environment. The method, which is preferably carried out during Power On Self Test (POST), first determines the maximum CPU host bus frequencies for each of a plurality of installed CPU cards. Maximum host bus frequencies are furnished by switch settings on each card. The switch settings are integrated into a serial scan chain which contains not only the maximum host bus frequency, but corresponding CPU core clock ratios and other assorted system information as well.

The maximum host bus frequencies settings are then compared. If all settings are the same, the host bus is configured to run at the specified frequency. If one CPU card is set for a slower host bus frequency, however, the slower frequency controls over other values and the host bus is set accordingly. Control signals for a clock generating circuit are set during POST such that the bus frequency is equal to the slowest of the host bus frequency settings. Setting the host bus frequency in this manner assures that all processors can functionally coexist on the shared bus.

After programming of the P6 host bus clock frequency is complete, core clock frequencies are set as high as possible for each installed processor. Initially, user-programmed switches on each CPU card set the core clock ratio for each processor based on the host bus frequency setting for that card. During POST, ROM sequences read all of the core clock ratio switch settings via the serial scan chain. An iterative process is then commenced wherein the core clock ratios for the processors on the faster card are incrementally increased and multiplied by the host bus frequency of the slower card. This process is repeated until the resulting core clock frequency exceeds the maximum rating for the processor under test. The core ratio is then decremented and saved as the optimized core ratio for that particular processor.

Control inputs to a programmable array logic (PAL) device are then generated based on the new core ratios for the faster card and the original core ratios for the slower card. In turn, the PAL establishes signals for setting the core ratios for each processor. Following a secondary hard reset, the new core ratios are latched into the installed processors. The computer system initially boots with the core ratios set to 2, which is the slowest available ratio setting in the disclosed embodiment.

Establishing the host bus frequency based on the slowest microprocessor/CPU card—and adjusting core clock ratios accordingly—insures that all microprocessors can functionally coexist on the shared host bus and yet perform internally in an optimal manner.

BRIEF DESCRIPTION OF THE DRAWINGS

A better understanding of the present invention can be obtained when the following detailed description of the preferred embodiment is considered in conjunction with the following drawings, in which.

In addition, various tables are provided throughout the detailed description to aid in interpretation of the figures.

DETAILED DESCRIPTION OF THE PREFERRED EMBODIMENT

Figure 1:
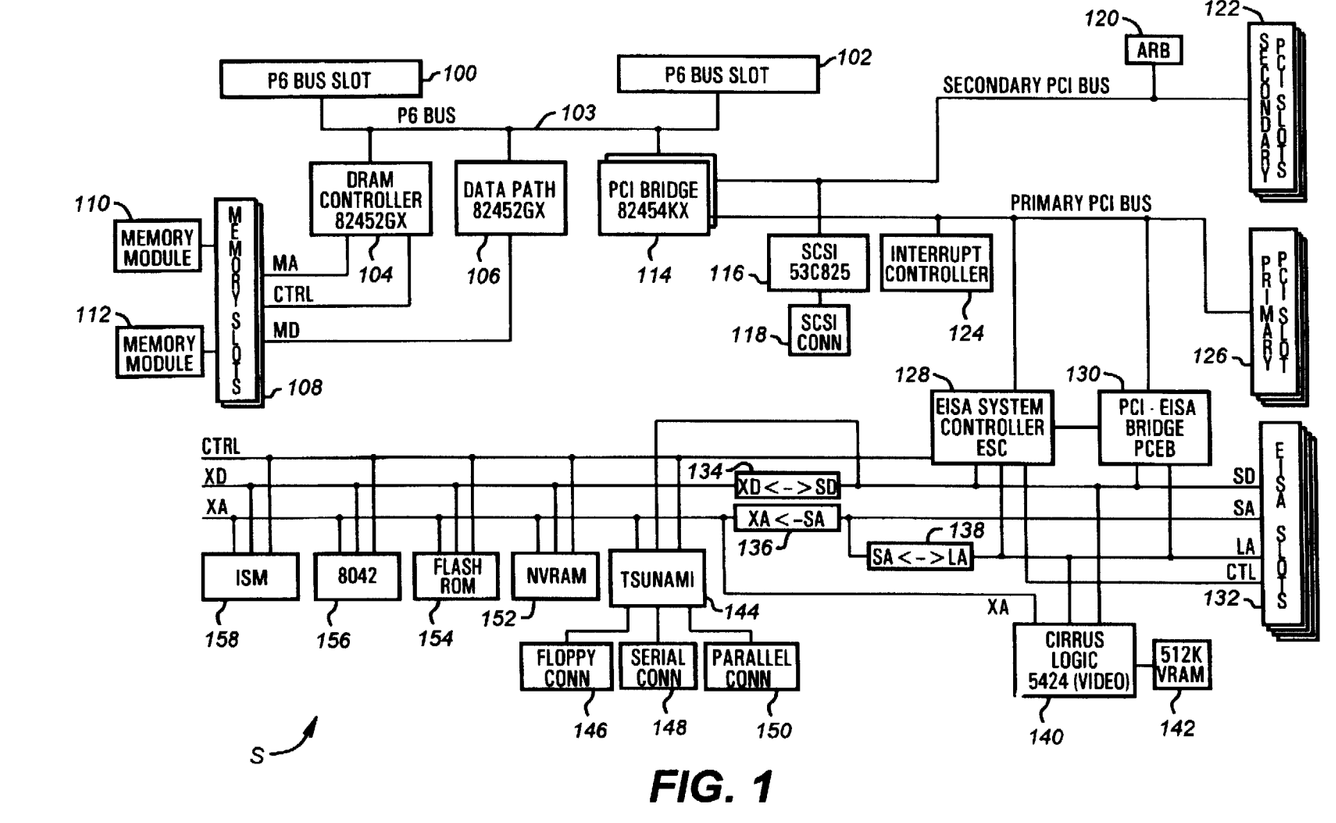
Fig. 1 is a block diagram of a computer system I/O board in accordance with the present invention.

Turning to FIG. 1, a server computer system I/O board S is disclosed. As in any computer system, the heart of the server computer is the processor. To provide sufficient processing capability for enterprise-class applications, the server computer of the present invention deploys a plurality of processors. The preferred processor is the Pentium Pro™ (P6) Processor available from Intel Corporation, although use of other processors is foreseen. The P6 processors reside on one or more CPU cards 160A and 160B (FIG. 2) which are plugged into P6 slots 100 and 102. The P6 slots 100 and 102 are connected to a CPU host bus called the P6 bus, which is preferably a 72-pin bus. The P6 bus is a high performance bus designed to support up to four processors. Preferably, each CPU card 160A and 160B supports, two P6 processors. Thus, the preferred embodiment supports up to four processors located on two cards.

In addition to the four processors, the P6 bus is connected to a memory controller 104 and a data path 106, which collectively form a DRAM control subsystem. Preferably, the DRAM controller is an 82453GX and the data path device 106 is an 82452GX, both of which are available from Intel Corporation. The DRAM controller 104 provides control and timing for the memory subsystem, while the data path 106 interfaces the 72-bit P6 host bus to the memory array. The memory controller 104 and the data path 106 are capable of taking a memory request from the CPU, queuing it, and responding after the requested operation has completed.

The P6 processor can have up to four uncompleted bus transactions pending before it stalls. To support up to four processors, the memory controller 104 is designed to cope with up to eight outstanding transactions, all of which must be buffered, kept in order, and snooped to preserve data coherency. Additionally, the controller 104 provides the error correction vital in server applications. The memory controller 104 can handle up to four gigabytes of page mode DRAM. Memory arrangements having non-interleaved, x2 and x4 interleaving configurations are supported by the memory control subsystem.

A plurality of memory modules 110 and 112 are connected to memory slots 108 to provide up to four gigabytes of memory. During operation, the actual performance of the memory subsystem will depend in part on the mix of read and write operations and the memory access patterns for a given application. The controller 104 minimizes the impact of the idle cycles by allowing read operations to bypass the write operations and be completed first so long as the memory addresses for the read/write pair do not match.

In addition to the memory controllers, a robust input/output system is provided in the server S. The I/O subsystem designed for the server must be scalable while meeting the performance requirements of the four P6's. The PCI bus currently provides the best combination of high performance and scalable I/O for the demanding environment faced in server applications. To provide PCI connections, one or more PCI bridges 114 are connected directly to the P6 bus. Preferably, the PCI bridge 114 is an 82454 PCI bridge (PB) from Intel which integrates the bus arbitration logic required to connect up to two 82454 PB components without any external glue logic. A system that requires more than two 82454 PBs must provide an external arbiter. In a multiple PCI bridge system such as that of the preferred embodiment, one of the PCI bridges 114 is configured by strapping options at power-up to be the compatibility PCI bridge. This PCI bridge provides the PCI compatible path to the boot ROM and the EISA/ISA bus. A second of the PCI bridges 114, call an auxiliary bridge, is configured by strapping options to be the auxiliary PCI bridge. The auxiliary bridge controlling the secondary PCI bus has an arbiter 120 which arbitrates accesses to the host after the compatibility bridge has been serviced.

The compatibility PCI bridge is the highest priority bridge to ensure a proper response time for ISA bus masters. Normally, the arbitration for the P6 bus is controlled by the compatibility bridge, which has a higher priority than the auxiliary bridge. The plurality of PCI bridges 114 provide a plurality of PCI buses, which because of their direct connections to the P6 bus, provide inherently faster arbitration response than the alternative of cascading PCI bridges together to provide for multiple PCI buses. Because each PCI bridge 114 is directly connected to the P6 host bus, the system S is capable of handling more PCI bridges as I/O bandwidth demands increase. This ability not only provides for design flexibility, but also for redundant I/O channels for systems in which reliability is paramount.

The PCI bridge 114 supports a full 64-bit interface to the CPU host bus, including support for all protocols as well as error correction. The PCI bridge 114 supports an 8-deep transaction in-order queue as well as separate 4-deep queues for both out bound (processor to PCI) and inbound (PCI to processor) transactions that are for the I/O bus agent. Also, like the DRAM controller 104, the PCI bridge 114 provides four 32-byte data buffers in both the inbound and outbound directions. The buffers decouple the host bus from the PCI bus and optimize performance by allowing the posting of data at full bus speeds in both directions. However, unlike the DRAM controller 104, the PCI bridge 114 supports up to two outstanding deferred-reply requests. This feature allows a bus transaction to be split and completed later, preventing the P6 host bus from becoming blocked by long latency I/O operations. In this mode, the PCI bridge 114 defers P6 memory reads, I/O reads, I/O writes, and interrupt acknowledge transactions. However, memory write transactions are not deferred since they are better optimized through posting.

Attached to the secondary PCI bus is a SCSI disk controller 116. The SCSI controller 116 provides the capability of handling the simultaneous disk commands necessary in a multi-threaded, multi-tasking operating system. Preferably, the SCSI controller 116 is a 53C825 available from NCR Corporation. Attached to the 53C825 are a plurality of SCSI connectors 118 which drive a plurality of disk drives (not shown) adapted to support the host system's simultaneous issuance of multiple commands to one or more SCSI devices. The ability to overlap commands and queue the commands to one or more devices can significantly boost performance in environments such as Windows 95 and NT. In addition to the SCSI controller 116, a plurality of devices may be plugged into the secondary PCI bus over a plurality of secondary PCI slots 122.

On the primary PCI bus, an interrupt controller 124 handles interrupt requests coming into the PCI bridge 114 for eventual transmission to one of the processors in the P6 slots 100 and 102. A number of PCI peripherals may be plugged into a plurality of primary PCI slots 126. Additionally, an EISA system controller ESC 128 and a PCI-EISA bridge PCEB 130 are connected to the primary PCI bus. The ESC 128 and the PCEB 130 must be connected to the primary PCI bus for timing reasons.

The combination of the ESC 128 and the PCEB 130 provides an I/O subsystem capable of taking advantage of the power of PCI while maintaining compatibility with a large number of EISA and ISA expansion cards and corresponding software applications. The ESC 128 and the PCEB 130 work in tandem to provide an EISA I/O subsystem interface for the computer system S. With the inclusion of the ESC 128 and the PCEB 130, the system S now contains three levels of buses structured in the following hierarchy: a P6 host bus as the execution bus; a PCI bus having a primary and secondary PCI interface; and an EISA bus as a secondary I/O bus. This bus hierarchy allows concurrency for simultaneous operation on all three bus environments. Data buffering permits concurrency for operations that cross over multiple buses.

The ESC 128 implements system functions such as timer/counter, DMA, interrupt controller, and EISA subsystem control functions such as EISA bus controller and EISA bus arbiter. The PCEB 130 provides the interface to bridge the PCI and EISA buses by translating bus protocols in both directions. It uses extensive buffering on both the PCI and EISA interfaces to allow concurrent bus operations. The ESC 128 and the PCEB 130 are connected to a plurality of EISA slots 132. Additionally, the ESC 128 also generates chip selects for certain functions that typically reside on an X bus. The ESC 128 generates chip select signals for an Integrated System Management (ISM) ASIC 158, a keyboard controller 156, a flash ROM 154, a non-volatile RAM 152, and a general purpose I/O device 144. The general purpose I/O device 144 supports floppy drives, serial ports, and parallel ports over floppy connectors 146, serial connectors 148, and parallel connectors 150.

The EISA slots 132 have system data lines connected to the data bus of the X bus via a buffer 134. Further, the EISA slots 132 have system address lines that are connected to the address lines of the X bus via buffer 136. The EISA slots 132 have latched address lines which are connected to the system address lines via buffer 138. Finally, a video controller 140 is connected to the X bus address lines, the EISA system data lines, and the latched address lines. Preferably, the video controller is a Cirrus Logic 5424 controller. The video controller 140 is connected to a video RAM 142 which is preferably 512 kilobytes in size.

Figure 2:
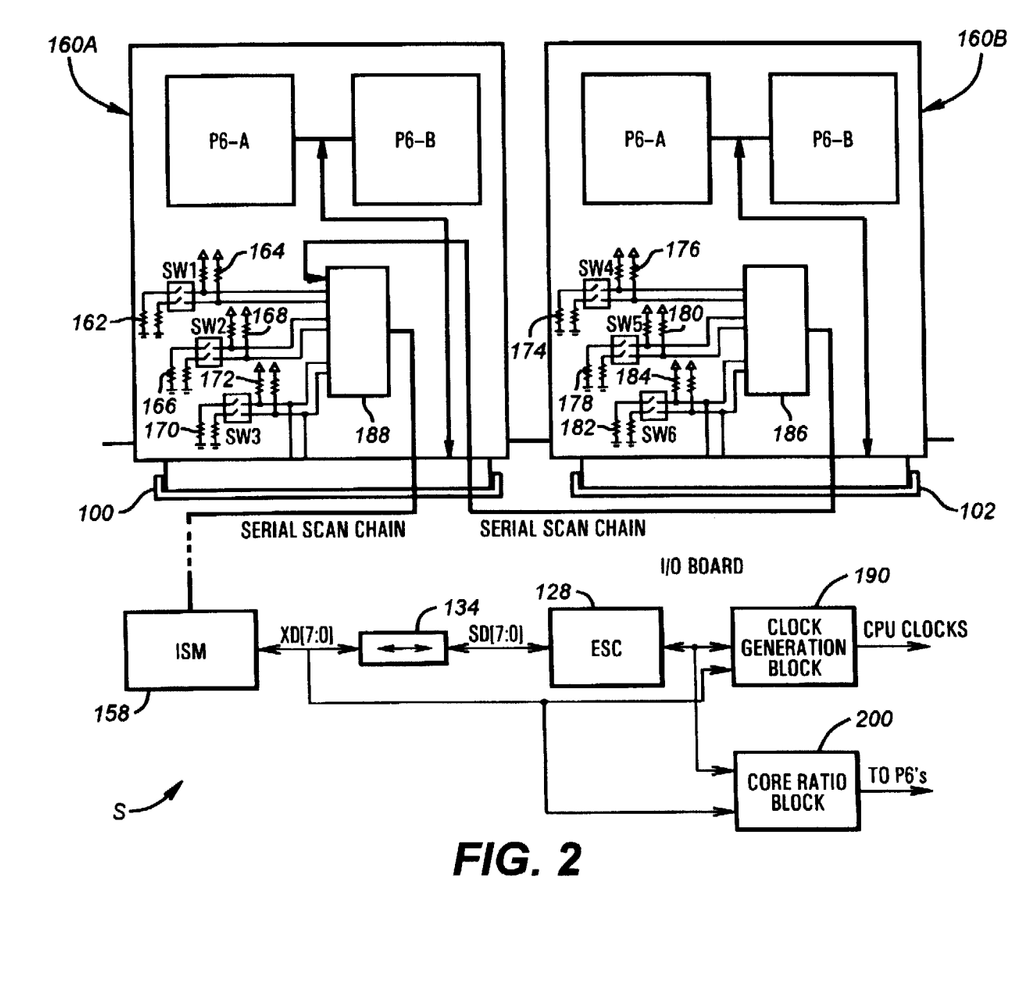
FIG. 2 is a block diagram of CPU boards of the computer system according to the present invention.

Referring now to FIG. 2, a block diagram of the CPU cards 160A and 160B is shown. Also shown are relevant portions of the I/O board S of FIG. 1. CPU cards 160A and 160B are configured to be plugged into P6 slots 100 and 102. CPU card 106A incorporates dual P6 sockets for a pair of processors P6-A and P6-B. Likewise, CPU card 160B houses a second pair of processors P6-C and P6-D. Each of the four processors share a common P6 bus.

The disclosed system uses the P6/Orion architecture defined by Intel Corporation and enhanced by Compaq Corporation for fault tolerance and recovery. Due to the importance of data integrity in a server system, the P6's are configured to support Functional Redundancy Checking (FRC). On each card 160A and 160B, an FRC configuration consists of one CPU acting as the master and the other acting as the slave or checker CPU. The two chips run in tandem, both running the same code. The slave compares its results with the master. If any discrepancy is registered, the system is notified. The two CPU's are maintained in lock step by synchronizing all of their inputs to the CPU clock.

The P6 bus utilizes an open-drain signaling scheme, referred to as GTL+, that supports relatively high clock frequencies, multiple loads and improved noise immunity. The GTL+ specification differs from standard Gunning transceiver logic primarily by raising the termination voltage from 1.2V to 1.5V (for increased noise margins) and by slowing down the edge rates to reduce ringing.

The disclosed embodiment supports up to four different P6 host bus frequencies and eight different core clock ratios. The term core clock ratio refers to ratio between the host bus clock frequency and the internal clock speed of the P6 processor. Each CPU card 160A and 160B has three sets of switches, with each set containing two switches. One set of switches SW1 on card 160A and one set of switches SW4 on card 160B are used to set the maximum host bus frequency for the cards. The maximum allowed host bus frequency for each card corresponds to the bus speed rating for the slower of the two installed P6's. In the disclosed embodiment, bus frequencies are determined according to the following switch settings:

| Bus Frequency (MHz) | SW1/SW4 | SW1/SW4 |
| --- | --- | --- |
| 50 | 1 | 1 |
| 60 | 1 | 0 |
| 66.66 | 0 | 1 |
| 45 | 0 | 0 |

It is contemplated that other host bus clock frequencies, such as 75 MHz or faster, could be used instead. Additional switches for setting a larger number of host bus clock frequencies are also contemplated.

A pair of pull-up resistors 164 connected between the outputs of the first set of switches SW1 and the positive power supply voltage are used to pull a switch output to a logic high level when the switch is open. Other resistor pairs 168, 172, 176, 180, and 184 perform the identical function for the other sets of switches SW2, SW3, SW4, SW5 and SW6 respectively. Similarly, a pair of pull-down resistors 162 at the inputs to the set of switches SW1 are used to short a switch output to ground when the switch is closed. Other resistor pairs 166, 170, 174, 178, and 182 provide the same function for the other sets of switches SW2, SW3, SW4, SW5 and SW6 respectively. Hence, a switch value of "1" indicates that the switch is open (i.e. its output is pulled high by a pullup resistor), while a value of "0" indicates that the switch is closed.

A second and third set of switches SW2 and SW3 are used to program the P6 core ratios for P6-A and P6-B respectively. Core ratios for P6-C and P6-D are set by additional switches SW5 and SW6 respectively. Programming of the core ratios is discussed more fully below in conjunction with FIGS. 5 and 6.

The outputs of the frequency and ratio switches SW1–SW6 are inserted into a serial scan chain via a pair of registers 186 and 188. The shift registers 186 and 188 are serial and parallel in, serial out shift registers. These and other scan chain registers (not shown) are daisy-chained together in a manner whereby each of the shift registers has a serial output connected to the serial input of the next successive shift register. The scan chain contains, among other information, identification and status signals from each of the processors, memory board information, etc. Further details of the serial scan chain configuration are disclosed in U.S. Pat. No. 5,287,531, entitled "APPARATUS FOR SYSTEM CONFIGURATION DETERMINATION" (issued Feb. 15, 1994, and hereby incorporated by reference).

Outputs of the switches SW4–SW6 of CPU card 160B are inserted into the scan chain via a first register 186. The serial output of this register 186 is connected to the serial input of a second register 188 on the other CPU card 160A. This register 188 incorporates the outputs of the remaining switches SW1–SW3 into the serial scan chain. The output of the second register 188, which is a continuation of the serial scan chain, eventually reaches the ISM 158.

The ESC 128 is programmed by a P6 based on the switch setting data received through the serial scan chain and stored in the ISM 158. As alluded to above, the ESC 128 is configured to generate chip select signals LATCH_FREQ and LATCH_RATIO for programming the components of the clock generation block 190 (FIGS. 3A–B) and LATCH_COREA and LATCH_COREC signals for the core ratio block 200 (FIG. 4).

Figure 3A:
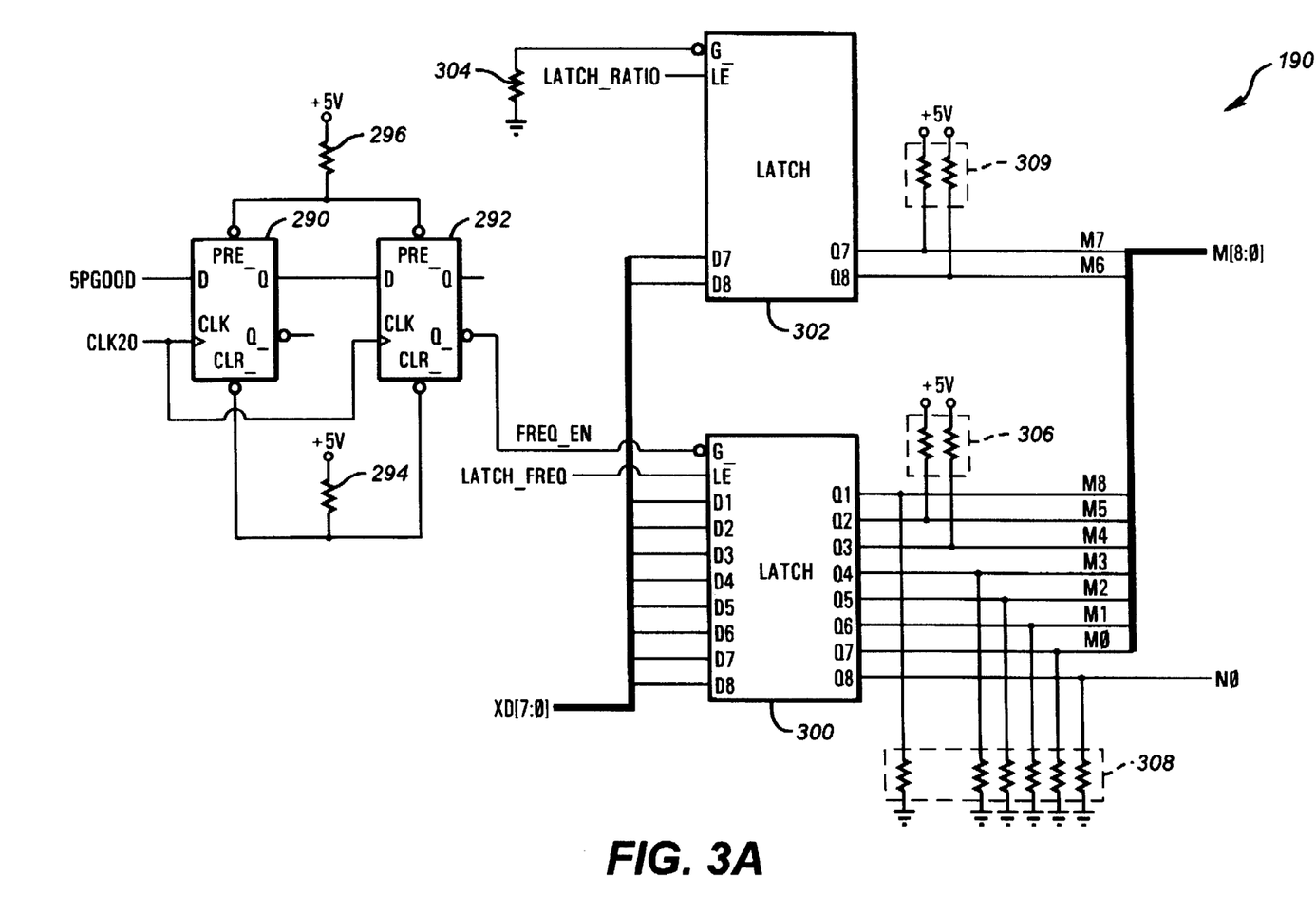
FIGS. 3A and 3B are schematic representations of circuitry for establishing host bus clock frequencies according to the present invention.
Figure 3B:
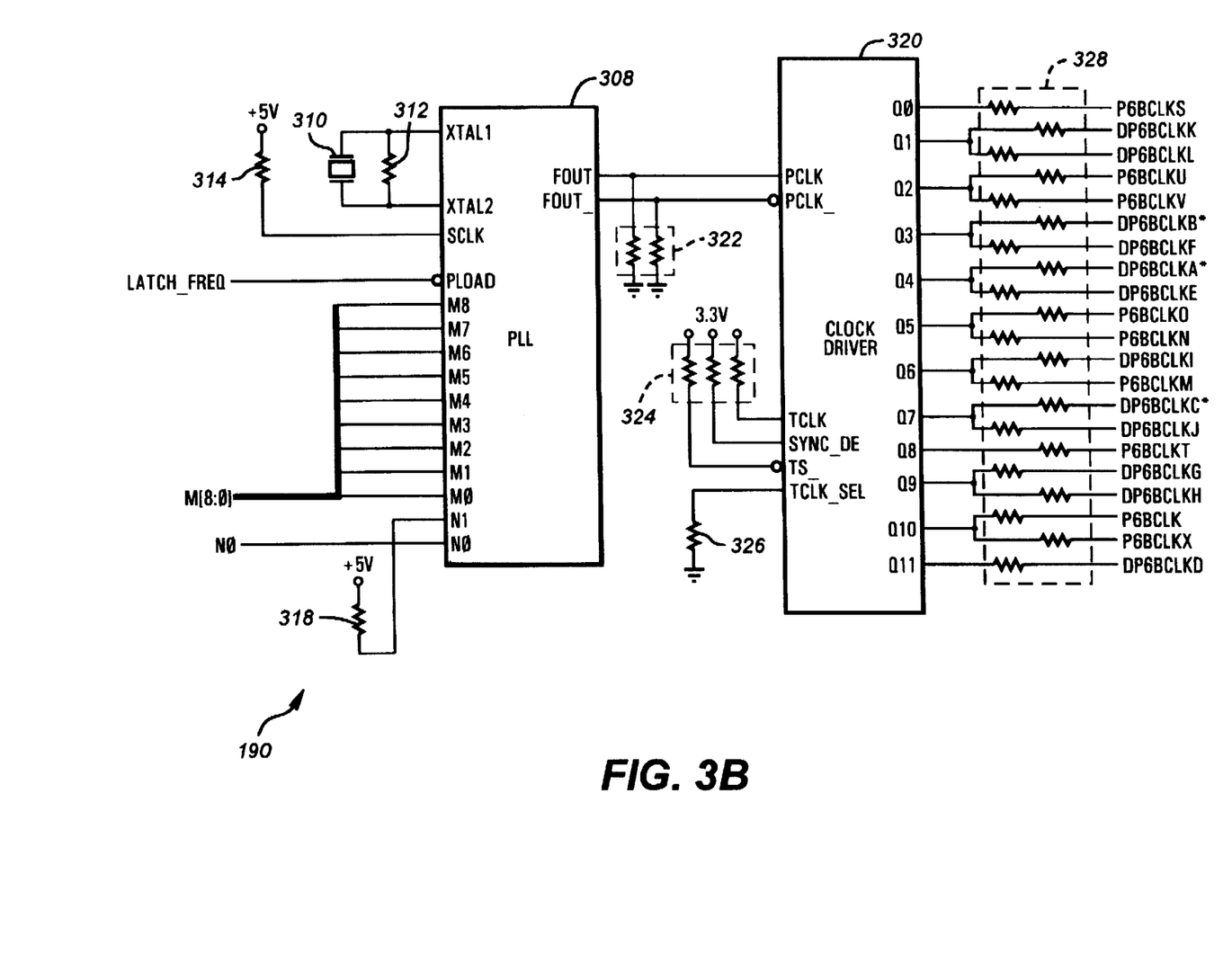
Figure 4:
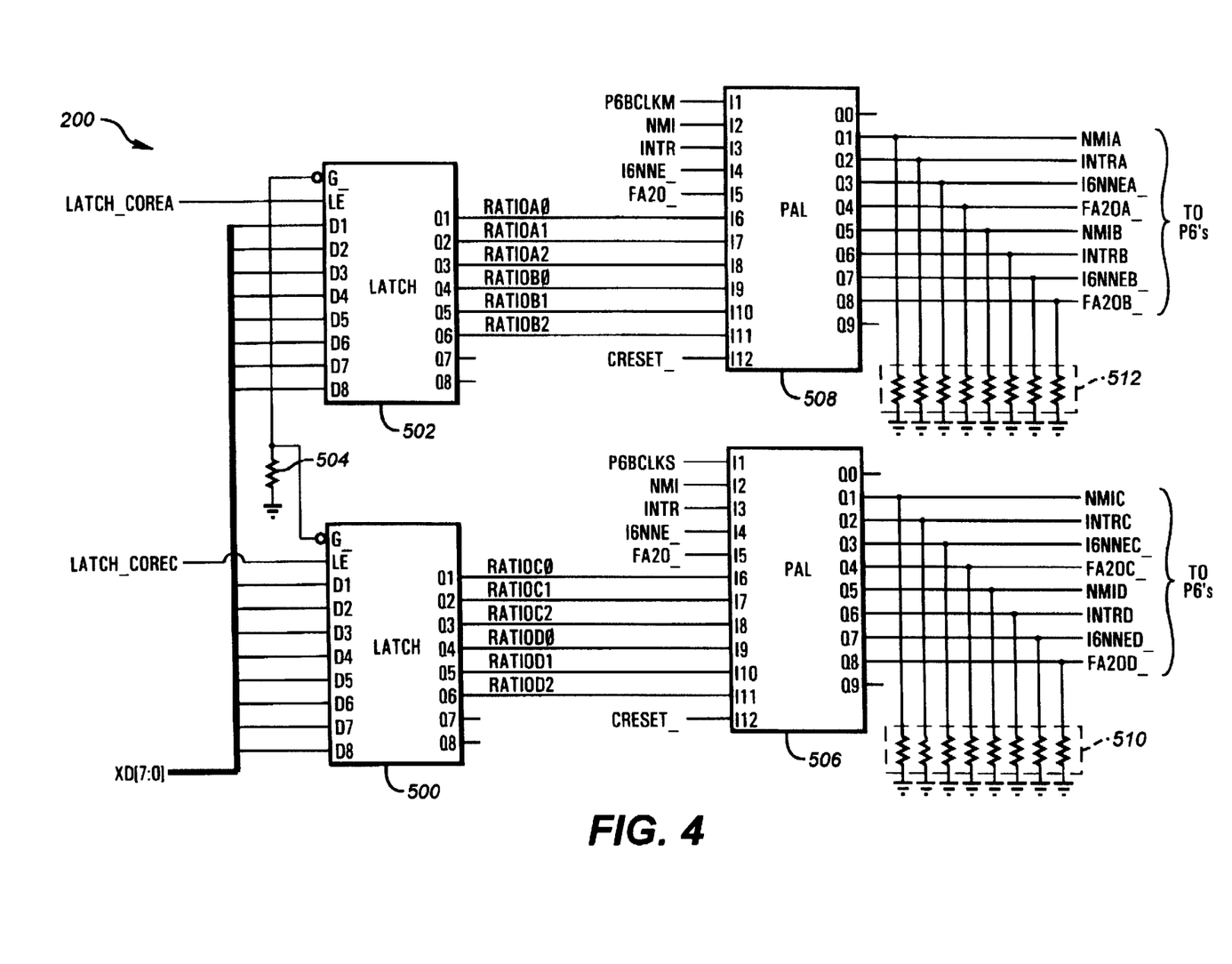
Fig. 4 is a schematic representation of circuitry for individually setting CPU core clock frequency ratios.

Referring now to FIGS. 3A and 3B, circuitry 190 for establishing host bus clock frequency according to the present invention is shown. The bus frequency switch settings are read through the serial scan chain by ROM during the Power-On Self Test (POST) routine. Based on the switch settings, control inputs M[8:0] and N0 for the PLL 308 are generated and sent over the XD[7:0] bus. The control signals are latched into the CPU addressable latches 300 and 302. More specifically, The D1–D8 inputs of a first latch 300 and the D7 and D8 inputs of a second latch 302 are utilized for programming the PLL 308. Latching enablement of the first latch 300 is controlled by the signal LATCH_FREQ, while latching enablement of the second latch 302 is controlled by the signal LATCH_RATIO. LATCH_FREQ and LATCH_RATIO are generated by ESC 128, and are asserted when the appropriate data is present on the XD[7:0] bus via 8 bit I/O writes.

Output enablement of the first latch 300 is controlled by the signal FREQ_EN_. This signal is generated by a pair D-type positive edge triggered flip-flops 290 and 292. Both flip-flops 290 and 292 are clocked by the signal CLK20. The signal 5PGOOD, which indicates that the system is properly powered up, is provided at the D input of the first flip-flop 290. When 5PGOOD transitions to a logic high level, the high signal is latched into the flip-flop 290 on the next rising edge of the clock signal CLK20. The Q output of this first flip-flop 290 is connected to the D input of a second flip-flop 292, so that the very next rising edge of the clock CLK20 latches a logic high level into the second flip-flop 292. The signal FREQ_EN_, which is generated by the Q_ output of the second flip-flop 292, then transitions to a logic low level, thereby enabling the outputs of the first latch 300. The set inputs PRE_ of both flip-flops 290 and 292 are tied to the positive power supply via a resistor 296. The reset inputs CLR_ of both flip-flops 290 and 292 are tied to the positive power supply via a second resistor 294. The output enablement pin G_ of the second latch 302 is tied to ground via a resistor 304. In the preferred embodiment, therefore, the outputs of latch 302 are constantly enabled.

The PLL 308 control signals are ordered on the XD[7:0] bus such that N0, M0–M5 and M8 correspond to the Q8–Q1 outputs, respectively, of the first latch 300, while M6 and M7 correspond to the Q8 and Q7 outputs of the second latch 302. Before the outputs of the first latch 300 are enabled, N0, M0–M3, and M8 are pulled individually to logic low levels via a resistor network 308. A resistor is connected between each output and ground. M5 and M4 are pulled individually to a logic high level by a second resistor network 306. Likewise, M6 and M7 are pulled individually to a logic high level by a third resistor network 309. In this manner, the default values of the PLL 308 control signals are set at M[8:0] =0F0h and N[1:0] =2h until the FREQ_ EN_ signal is set at a logic low level. These values correspond to a default host bus speed of 50 MHz. Other clock frequencies generated by the PLL 308 are programmed according to the following table:

| P6 BUS SPEED | N = | M = |
| --- | --- | --- |
| 45.0 MHz | 3h | 1B0h |
| 50.0 MHz | 2h | 0F0h |
| 60.0 MHz | 2h | 120h |
| 66.6 MHz | 2h | 140h |
| 75.0 MHz | 2h | 160h |

Referring more specifically to FIG. 3B, support circuitry for PLL clock generator 308 and clock driver chip 310 of the clock generation block 190 is shown. In the preferred embodiment, the N1 control input to the PLL 308 is tied to a logic high level via a resistor 318. The synchronizing clock input SCLK is tied high via a resistor 314. The program signal load pin PLOAD is controlled by the LATCH_FREQ signal. This pin PLOAD is enabled on the falling edge of LATCH_FREQ following the latching of PLL 308 control signals into the first latch 300.

An oscillator crystal 310 and a resistor 312 are connected in parallel across the XTAL1 and XTAL2 inputs of the PLL 308. The crystal 310 is chosen to generate a specified reference clock frequency for the PLL 308. PLL 308 outputs FOUT and FOUT_ have a frequency that is a multiple of the reference clock frequency established by the oscillator crystal 310. The output frequency is determined by the control signals M[8:0] and N[1:0]. The resistor 312 is typically a large value bias resistor that connects the input and output of an oscillator inverter internal to the PLL 308, causing it to self bias at approximately one half the supply voltage. Duty cycle of the reference clock signal is thereby improved. FOUT and FOUT_, which are differential outputs, are essentially the host bus clock signal that is driven by a clock driver chip 320.

The PCLK input of the clock driver 320 is connected directly to the FOUT output of the PLL 308, while the PCLK_ input is connected to FOUT_. The TCLK, SYNC_OE, and TS_ inputs of the clock driver 320 are individually pulled to logic high levels via a resistor network 324. TCLK is used to select TTL level clock outputs, while assertion of TS_ causes an asynchronous tristate of all outputs. SYNC_OE controls synchronous output enablement via a series of internal flip-flops which determine when the clock drivers are enabled. The TCLK_SEL input is pulled to a logic low level by a resistor 326.

The outputs Q0–Q11 of the clock driver 320 provide clock signals for various system components, including the host bus clocks DP6BCLKA-D for the four P6's. Clock driver 320 outputs Q1–Q7 and Q9–Q10 are configured to provide two clock signals apiece. Each clock signal is connected individually to one of the outputs Q0–Q11 via a resistor in the resistor network 328. The resistor network 328 is used to model inductor and capacitor delay elements that can be added as needed to negate differences in load impedances seen by the output drivers. Alternatively, the resistor network 328 could be used to counter transmission line effects encountered at high clock frequencies.

After programming of the P6 host bus clock frequency is complete, the POST routine directs programming of the core clock ratios for each installed P6. The term core clock ratio refers to the ratio between the host bus clock frequency and the internal clock speed of the P6 processor. User-programmed switches set the core clock ratio for each P6. Briefly summarizing, ROM code reads all of the core clock ratio switch settings through the serial scan chain and provides control inputs to a programmable array logic (PAL) device. In turn, the PAL establishes the core ratios settings for each P6. Core ratio registers are then programmed for each desired core multiplier. The computer system initially boots with the core ratios set to 2, which is the slowest available ratio setting. This is the default configuration in which all processors start up to allow proper booting of the system.

If original CPU card switch values are used, all P6's should run at or below their maximum rated core frequencies when the host bus frequency is set to that of the slowest card 160A or 160B. If there is a mismatch in the host bus speeds between the two cards 160A and 160B, however, the faster of the P6's may not be utilized to their full potential. For example, consider a situation wherein two P6's are installed on one card 160A with a host bus speed of 50 MHz and core ratios of 2/6 (yielding a core frequency of 150 MHz), while the switches on the other card 160B are set for a host bus speed of 66 MHz and core ratios of 2/5 (166 MHz). In the disclosed embodiment of the invention, the host bus speed is set at 50 MHz so that the P6's may coexist on the same host bus. With this host bus frequency, the cores of the faster P6's are running at (2/5)×(50 Mhz)=125 MHz— well below their maximum potential. As can be seen, core ratios for the P6's on the faster card 160B are ideally increased from the values set by the switches in order to obtain optimal system performance. Many other contemplated P6 configurations present the same problem.

Referring to FIG. 4, the core ratio block 200 circuitry for establishing optimized core clock ratio settings is shown. PAL 506 and 508 control inputs are programmed into appropriate core ratio latches 500 and 502 via two 8-bit I/O writes over the XD[7:0] bus. Latching enablement for a first latch 500 is controlled via the LATCH_COREC signal, while latching enablement for a second latch 502 is controlled via the LATCH_COREA signal. These signals LATCH_COREA and LATCH_COREC are generated by chip select logic (not shown) in a manner similar to that used to generate LATCH_FREQ and LATCH_RATIO. The LATCH_COREA and LATCH_COREC signals are asserted when the appropriate data is present on the XD[7:0] bus. The output enablement pin G_ of each latch 500 and 502 is tied to ground via a resistor 504. The outputs are therefore constantly enabled in the preferred embodiment.

The first latch 500 provides core ratio control inputs RATIOC0-RATIOC2 and RATIOD0-RATIOD2 for P6-A and P6-B, respectively. These control signals are provided to the I6–I11 inputs of a first PAL 506. The second latch 502 provides core ratio control inputs RATIOA0–RATIOA2 and RATIOB0–RATIOB2 for P6-A and P6-B, respectively. These control signals are provided to the I6–I11 inputs of a second PAL 508. The PALs 506 and 508 generate the power-on configuration information that sets the core frequency to bus frequency ratios for the P6's P6-A, P6-B, P6-C and P6-D. The PAL 506 and 508 inputs are determined during POST (detailed in FIGS. 5A and 5B) based on the CPU board switches SW2, SW3, SW5 and SW6 as follows:

| Bus/Core Frq | SWx | SWy | Ratio2 | Ratio1 | Ratio0 |
| --- | --- | --- | --- | --- | --- |
| 2/4 | 1 | 1 | 1 | 1 | 1 |
| 2/5 | 1 | 0 | 1 | 1 | 0 |
| 2/6 | 0 | 1 | 1 | 0 | 1 |
| 2/7 | 0 | 0 | 1 | 0 | 0 |
| 2/8* | 0 | 0 | 0 | 1 | 1 |
| 2/9* | 0 | 0 | 0 | 1 | 0 |
| 2/10* | 0 | 0 | 0 | 0 | 1 |
| 2/11* | 0 | 0 | 0 | 0 | 0 |

ROM can be programmed later to replace core ratio 2/7 with one of the ratios marked with "*".

Inputs to both of the PALs 506 and 508 include the NMI, INTR, INGNNE_and FA20_signals. An "_" subscript indicates an inverted signal. These signals are all synchronized to the host bus clock. Under normal operating conditions, the NMI signal is generated in the ESC 128 and indicates that an external non-maskable interrupt has been generated. INTR is an active maskable interrupt input indicating that an external interrupt has been generated. IGNNE is the ignore numeric error input. Under the proper conditions, assertion of this pin causes the CPU to ignore any pending unmasked numeric exception and continue executing floating point instructions for the entire duration that this pin is asserted. Both IGNNE and INTR are generated in the interrupt controller 124.

FA20 is a signal used to mask the A20 address bit for compatibility reasons and is generated in the ISM 158. CRESET_, another input to both PALs 506 and 508, is generated in the OPB 114 and is used to reset the P6 cores. The first PAL 506 is clocked via the P6BCLKS bus clock signal, while the second PAL 508 is clocked by the P6BCLKM bus clock signal.

The IGNNE_signal, in conjunction with NMI, FA20_, and INTR, is used to set the core frequencies of the four P6's P6-A, P6-B, P6-C and P6-D. The contemplated I/O board S drives four sets of configuration lines. Each set configures one P6 core ratio independently. The first PAL 506 drives the signals NMIC, INTRC, IGNNEC_, and FA20C_for configuring P6C; and NMID, INTRD, IGNNED_, and FA20D_for configuring P6D. The second PAL 508 drives the signals NMIA, INTRA, IGNNEA_, and FA20A_ for configuring P6-A; and NMIB, INTRB, IGNNEB_, and FA20B_ for configuring P6-B. In the preferred embodiment the host bus frequency to core frequency ratio configuration is determined by the PAL 506 and 508 outputs as follows:

| Bus/Core Frq | NMIx | INTRx | IGNNEx_ | FA20x_ |
|---|---|---|---|---|
| 2/4 | 0 | 0 | 0 | 0 |
| 2/5 | 0 | 0 | 0 | 1 |
| 2/6 | 0 | 0 | 1 | 0 |
| 2/7 | 0 | 0 | 1 | 1 |
| 2/8 | 0 | 1 | 0 | 0 |
| 2/9 | 0 | 1 | 0 | 1 |
| 2/10 | 0 | 1 | 1 | 0 |
| 2/11 | 0 | 1 | 1 | 1 |

Each of the outputs of the first PAL 506 is connected to ground via individual resistors in a resistor network 510. Likewise, each of the outputs of the second PAL 508 is connected to ground via a resistor in a second resistor network 512 The PALs 506 and 508 therefore drive default core clock ratios of 1/2 for each processor when the PAL 506 and 508 outputs are not enabled (all outputs are pulled low).

Programming of the PALs 506 and 508 is accomplished according to the following equations:

NMIA, NMIB, NMIC, NMID=(CRESET_×NMI);

INTRA=(CRESET×RATIOA0_)+(CRESET_×INTR);

INTRB=(CRESET×RATIOB0_)+(CRESET_×INTR);

INTRC=(CRESET×RATIOC0_)+(CRESET_×INTR);

INTRD=(CRESET×RATIOD0_)+(CRESET_×INTR);

IGNNEA=(CRESET×RATIOA1)+(CRESET_×IGNNE);

IGNNEB=(CRESET×RATIOB1)+(CRESET_×IGNNE);

IGNNEC=(CRESET×RATIOC1)+(CRESET_×IGNNE);

IGNNED=(CRESET×RATIOD1)+(CRESET_×IGNNE);

FA20A=(CRESET×RATIOA2)+(CRESET_×FA20);

FA20B=(CRESET×RATIOB2)+(CRESET_×FA20);

FA20C=(CRESET×RATIOC2)+(CRESET_×FA20);

and

FA20D=(CRESET×RATIOD2)+(CRESET_×FA20).

Thus, when the CRESET signal is asserted, each P6 enters a core ratio configuration mode and the core ratio values are programmed via the NMI, INTR, IGNNE and FA20 pins of the respective processors. When the CRESET signal is not asserted, the aforementioned pins function in a normal manner. This multiplexing scheme results in a decreased pin count for the P6.

Figure 5A:
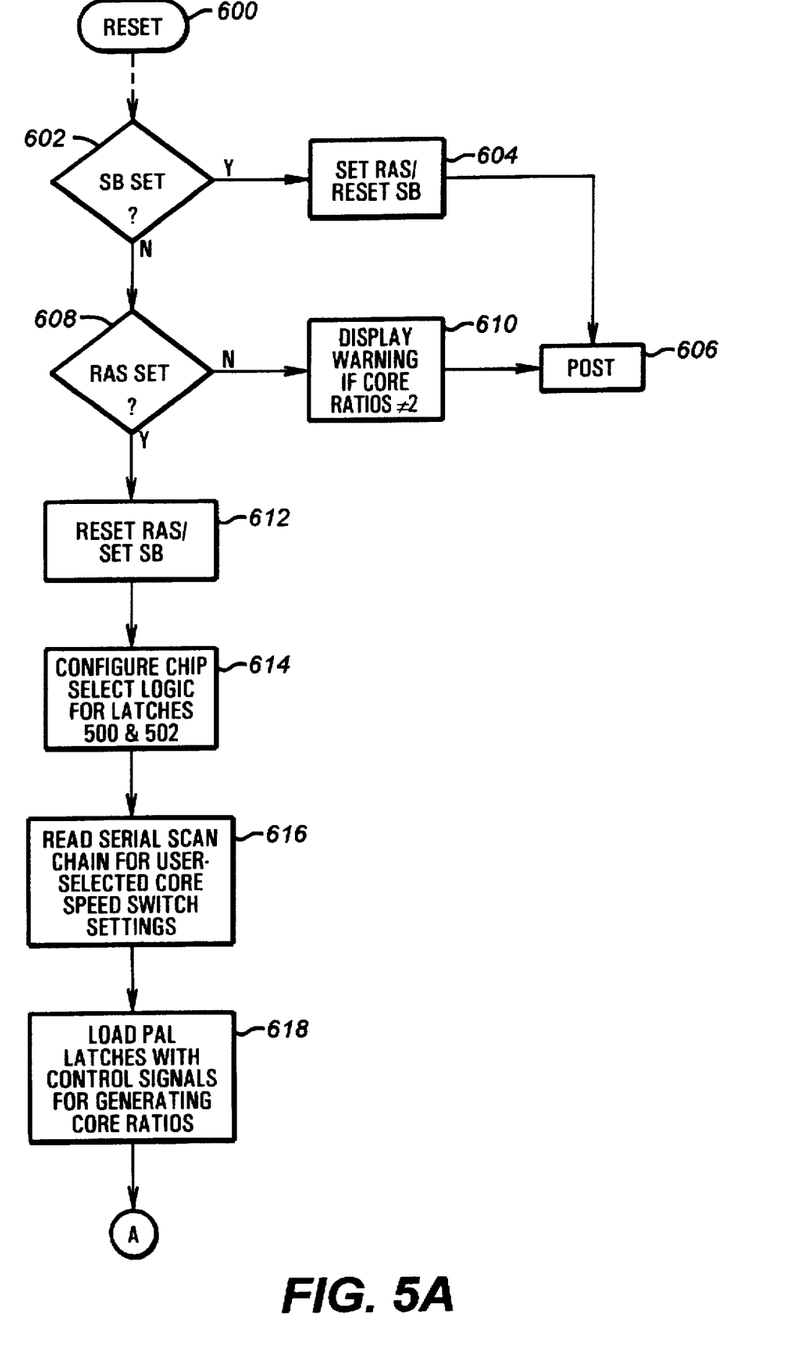
Figs. 5A and 5B are flowchart sequences of a routine for determining the optimal host bus clock frequency and setting core clock frequency ratios during system power-up.
Figure 5B:
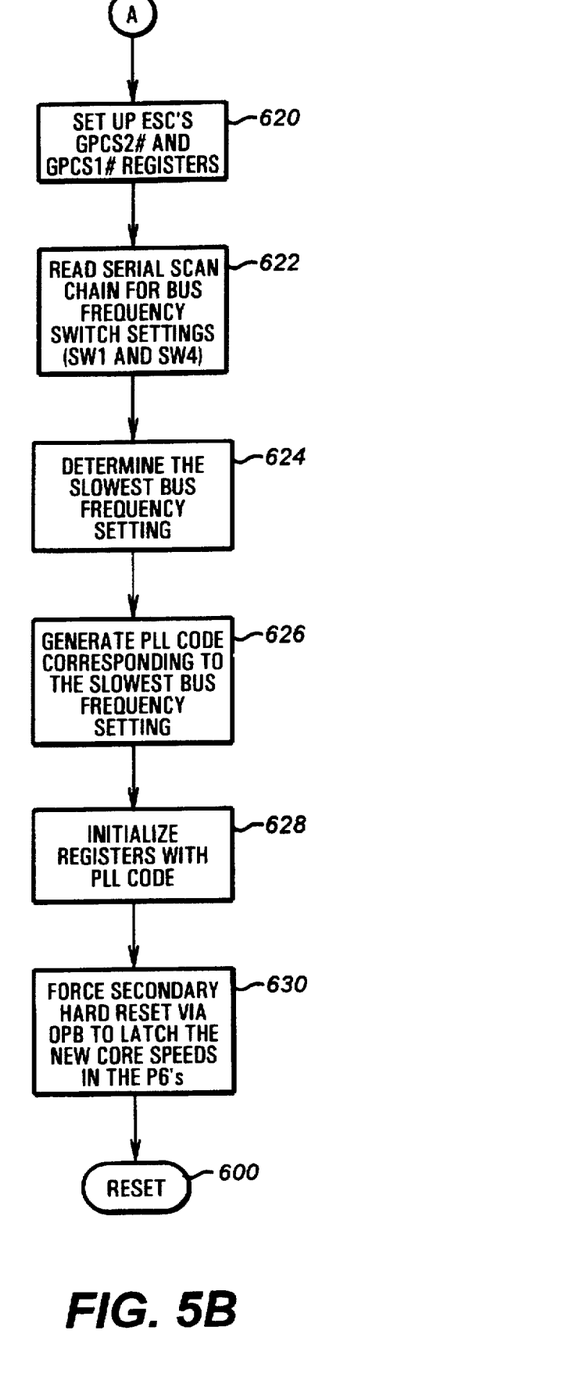

The procedure for programming the optimal host bus frequency and core ratios during system power-up is illustrated by FIGS. 5A and 5B. More particularly, a flowchart sequence for relevant portions of an exemplary POST routine for dynamically setting the optimal host bus clock frequency and resetting core clock frequency ratios is shown. The POST routine is contained in BIOS ROM on the I/O board S. The BIOS ROM needs two control bits in order to program the core clock ratios. The first bit is called the "RAN AT SPEED" (RAS) bit, while the second bit is called the "SECOND BOOT" (SB) bit. The RAS bit, when set, indicates to the ROM that the system ran at speed the last time it booted and that the bus/core frequencies should be programmed after power-up. The SB bit, when set, indicates to the ROM that it has already programmed the frequencies so that control doesn't remain in a loop. The RAS bit is preferably saved in non-volatile RAM, while the SB bit could be a bit in the OPB 114 registers or other registers that do not change with a secondary reset.

The reset sequence 600 is initiated when the computer system is turned on. Following a reset, step 602 tests the SB bit to determine if it is set. If SB is set, control proceeds to step 604 where the ROM code resets SB and sets RAS. Control then proceeds to the main POST routine in step 606. If SB is not set, control proceeds to step 608 determine if the RAS bit is set. If the RAS bit is not set, control is passed to step 610 and an error message is displayed if the core ratios should be different than the default value of 2. Control then proceeds to main POST routine in step 606.

If the RAS bit is found to be set in step 608, control proceeds to step 612 where the ROM code resets the RAS bit and sets the SB bit. Control next proceeds to step 614 for configuration of the chip select logic for latches 500 and 502. As mentioned above in conjunction with FIG. 4, this chip select logic (not shown) generates the signals LATCH_COREA and LATCH_COREC. The LATCH_COREA and LATCH_COREC signals are asserted when the appropriate PAL control data for the latches 500 and 502 is present on the XD[7:0] bus.

Control proceeds to step 616 where the ROM reads the serial scan chain for user-selected core speed switch settings. Next, in step 618 PAL control signals for generating core ratios are programmed into appropriate core ratio latches 500 and 502 via two 8 bit I/O writes. Generation of PAL control signals according to the disclosed embodiment is described in more detail in conjunction with FIGS. 6A and 6B. After powerup, the core ratios are set to 2 (the slowest setting) by default.

After the latches 500 and 502 have been properly programmed with PAL control signals, subroutine flow passes to step 620 of FIG. 5B to begin optimization of the host bus frequency. In step 620, the ESC 128 registers for the GPCS2# and GPCS1# pins are configured. The General Purpose Chip Select pins in the ESC—GPCS2# and GPCS1# —are active low pins used to provide the LATCH_FREQ and LATCH_RATIO signals to select the latches 300 and 302 so that they may be initialized with the proper inputs for the PLL 308. Configuration of the GPCS2# and GPCS1# pins is discussed more fully in the databook for the 82374EB EISA Component (ESC) published by Intel Corporation.

Control next proceeds to step 622, where host bus frequency switch settings SW1 and SW4 are retrieved from the serial scan chain. These settings are then compared in step 624 to determine the slowest host bus setting according to pre-defined values. Control then proceeds to step 626 where PLL 308 control signals are generated. Importantly, the control signals M[8:0] and N[1:0] are based on the switch setting corresponding to the slowest host bus frequency. The output of the PLL clock generator 308 is thereby set to equal the slower of the host bus frequencies set on the two CPU cards 160A and 160B. Setting the host bus frequency in this manner assures that all processors can functionally coexist on the shared bus.

Control proceeds to step 628 and the aforementioned PLL clock generator 308 control values are written to the latches 300 and 302 via two 8-bit I/O writes over the XD[7:0] bus at the appropriate addresses defined for the GPCS2# and GPSC1# pins. Control next passes to step 630 and a secondary hard reset (step 600) is forced via the OPB 114. The reset asserts the CRESET signal, which latches the new core speeds into the appropriate P6's in accordance with the aforementioned PAL equations. Forcing a hard reset at this point causes the new core frequency ratios and the new host bus frequency to be actuated at approximately the same time.

Figure 6A:
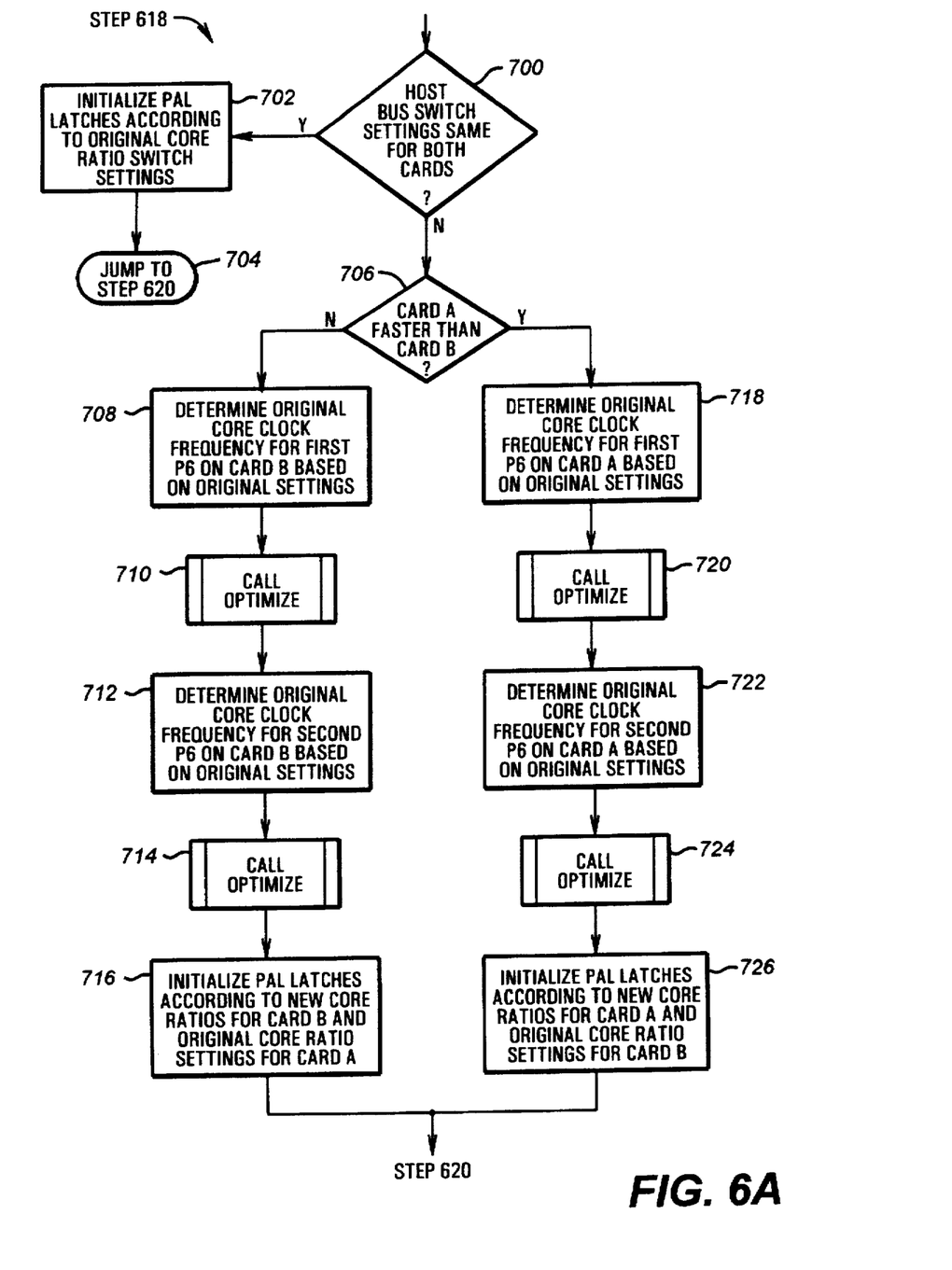
FIGS. 6A and 6B are detailed flowchart sequences for portions of the routine of FIG. 5B.
Figure 6B:
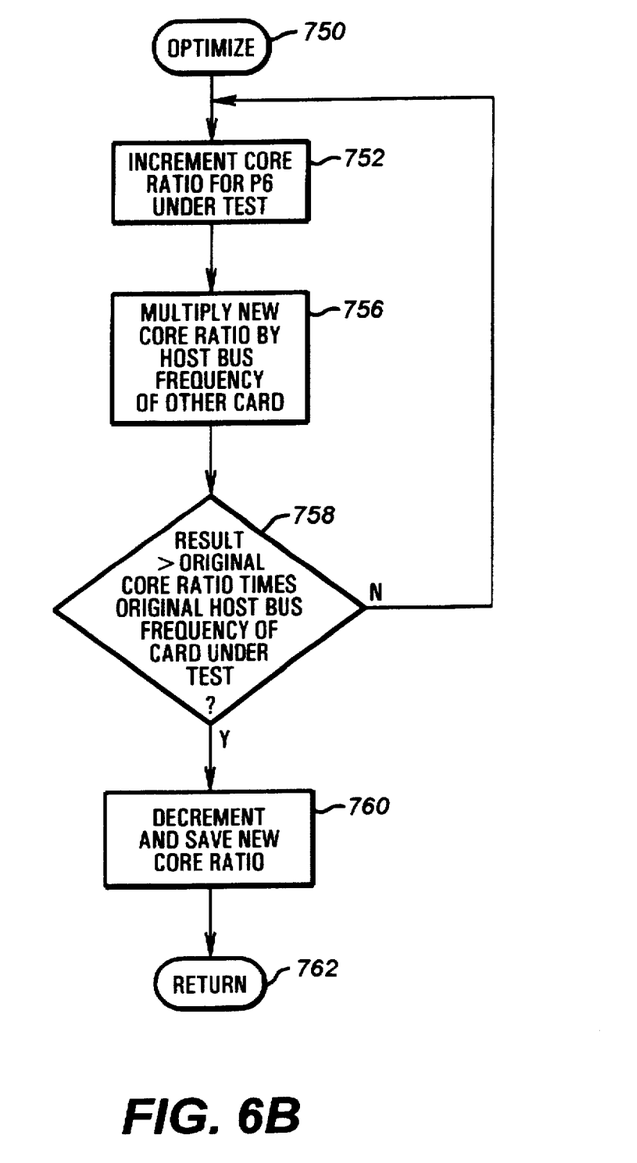

A flowchart sequence of contemplated POST routine steps for setting optimal core clock ratios is shown in FIGS. 6A and 6B. These figures provide more detail of step 618 of FIG. 5A. Step 618 of FIG. 5A is initiated in step 700 of FIG. 6A, where the host bus switch settings are compared. If they are equal, control passes to step 702 where the PAL latches are set according to the original core ratio switch settings. Control then proceeds to step 704 where a jump is made to step 620 of FIG. 5B to begin optimization of the host bus frequency.

If the host bus switch settings are not equal, control proceeds to step 706 to determine if the host bus setting of card 160A is faster than that of card 160B. If not, control next proceeds to step 708 where the original core clock frequency of a first P6 on CPU card 160B, as set by the switches, is calculated. The subroutine OPTIMIZE 750 (FIG. 6B) is then called in step 710. OPTIMIZE calculates the maximum core ratio setting for the processor based on a slower host bus clock frequency than originally set for the CPU card 160B. Upon return from OPTIMIZE, control proceeds to step 712 to determine the original core clock frequency of the second P6 on the CPU card 160B. OPTIMIZE is then called again in step 714.

Following the second return from OPTIMIZE, control passes to step 716 where the PAL control signals are written to latches 500 and 502. PAL control signals for the P6's of card 160B are generated according to the optimized core ratios as determined in steps 710 and 714, while PAL control signals for the P6's of card 160A are set according to the original switch settings for that card. Note that the routine of FIGS. 5A, 5B, 6A and 6B assumes that switch settings have been optimized for each card 160A and 160B individually prior to installation. Minor modifications could be made to the routine to allow examination of each installed P6 individually, as opposed to just those of the faster card.

If the host bus setting of card 106A is faster than that of card 106B as determined in step 706, control proceeds to step 718 where the original core clock frequency of a first P6 on CPU card 160A, as set by the switches, is calculated. The subroutine OPTIMIZE is then called in step 720. Upon return from OPTIMIZE, control next proceeds to step 722 where the original core clock frequency of the second P6 on CPU card 160A is calculated. OPTIMIZE is again called in the next step 724. After the second return from OPTIMIZE, control passes to step 726 where the PAL control signals are written to latches 500 and 502. PAL control signals for the P6's of card 160A are generated according to the optimized core ratios as determined in steps 720 and 724, while PAL control signals for the P6's of card 160B are set according to the original switch settings for that card. Following either of steps 716 or 726, control proceeds to step 620 of FIG. 5B to begin optimization of the host bus frequency.

FIG. 6B provides details of the OPTIMIZE routine 750 for optimizing the core ratio setting for a processor based on a slower-than-anticipated host bus clock frequency. In a first step 752, the core ratio switch setting for the P6 under test is incremented to provide for the next fastest core clock frequency. For example, a switch setting of 2/5 is incremented to 2/6 in this step. Control then proceeds to step 756 where the incremented core ratio is multiplied by the host bus frequency setting of the card that does not contain the P6 under test. This host bus frequency is the slower of the two host bus frequencies set on the CPU cards 500 and 502.

Control then passes to step 758 to determine if the frequency calculated in the previous step 756 is greater than the original core ratio of the P6 under test multiplied by its original host bus frequency. A negative determination indicates that the incremented core ratio results in a core frequency that is slower than the specified maximum core frequency for the P6 under test. In this case, control reverts to step 752 and the new core ratio is incremented again. This iterative process continues until original core frequency is surpassed by the new core frequency. Control then proceeds to step 760 where the new core ratio is decremented to its previous value and saved. A return is made in the final step 762. The routine of FIG. 6B, therefore, returns a core ratio that results in a core frequency optimized for the slowest of the host bus frequency settings. In an alternate embodiment of the invention, it is contemplated that step 618 could be accomplished via a table lookup process.

Thus, a method has been described for setting the host bus clock frequency in a multi-processor computer system according to the slowest host bus frequency setting of the installed processors. Processor core clock ratios are then optimized for the new host bus frequency. The core clock optimization process first determines the original processor core clock ratio settings for each installed processor. These ratio settings are individually optimized by an iterative process wherein the core clock ratios are incrementally increased and multiplied by the new host bus frequency. The process continues until the incremented core clock ratio yields a core clock frequency that exceeds the maximum rating for the processor undergoing optimization. The core clock ratio is then decremented and latched into the processor via a hard reset. Following optimization, all processors can functionally coexist on a shared host bus and perform internally in an optimal manner.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the scope and spirit of the invention.

What is claimed is:

1. A method for establishing the host bus clock frequency and processor core clock ratios in a multiprocessor computer system, the method comprising the steps of:

determining original host bus frequency settings for installed microprocessors;

configuring clock generation circuitry to produce an optimized host bus clock frequency substantially equal to the slowest of said original host bus frequency settings;

determining original processor core clock ratio settings for installed microprocessors;

optimizing each of said original processor core clock ratio settings to provide the maximum possible processor core frequency for said optimized host bus clock frequency; and configuring each of said processors to utilize said optimized core clock ratio settings.

2. The method of claim 1, wherein said step of determining original processor core clock ratio settings for installed microprocessors comprises the steps of:

inserting said original core frequency ratio settings into said serial scan chain; and retrieving said original core frequency ratio settings from said serial scan chain during Power On Self Test.

3. The method of claim 1 wherein said step of configuring each of said processors to utilize said optimized core clock ratio settings includes the step of forcing a secondary hard reset to latch said optimized core frequency ratios into said installed processors.

4. The method of claim 1, wherein said step of determining host bus frequency settings for installed microprocessors comprises the steps of:

inserting said original host bus frequency settings into a serial scan chain; and retrieving said original host bus frequency settings from said serial scan chain during Power On Self Test.

5. The method of claim 4, wherein said step of determining original processor core clock ratio settings for installed microprocessors comprises the steps of:

inserting said original core frequency ratio settings into said serial scan chain; and retrieving said original core frequency ratio settings from said serial scan chain during Power On Self Test.

6. An apparatus for establishing the host bus clock frequency and processor core clock ratios in a multi-processor computer system utilizing processor cards, the apparatus comprising:

means for communicating a maximum host bus frequency for each of a plurality of installed dual-processor cards;

means for communicating an original processor core frequency ratio for each processor of said plurality of dual-processor cards;

configuration means for establishing an optimal host bus frequency substantially equal to the slowest of said maximum host bus frequencies; and additional configuration means for establishing an optimized processor core frequency ratio for each of said processors based on said optimal host bus frequency.

7. The apparatus of claim 6, wherein said means for communicating a maximum host bus frequency for each of a plurality of processor cards comprises a first set of switches on each of a plurality of said processor cards, said first set of switches establishing a maximum host bus frequency for a particular one said processor cards; and wherein said means for communicating a processor core frequency ratio for each processor installed on each of said plurality of processor cards comprises a second and a third set of switches on each of said plurality of said processor cards, each of said second and third set of switches providing a core frequency ratio for one of said processors.

8. The apparatus of claim 7, wherein each of said dual-processor cards further comprises a serial and parallel in, serial out shift register for inserting the settings of said first, second and third sets of switches into a serial scan chain for communication to said configuration means.

9. A multi-processor capable computer system incorporating circuitry for establishing optimized host bus clock frequency and processor core clock ratios for installed processor cards, the computer system comprising:

a host bus;

at least one processor card slot coupled to the host bus for receiving a processor card(s);

a communication channel coupled to the at least one processor card slot for communicating a maximum host bus clock frequency rating for each installed processor card;

a host bus clock generation circuit for establishing the bus clock frequency of the host bus;

host bus configuration circuitry coupled to the host bus clock generation circuit and the communication channel for directing the host bus clock generation circuit to establish an optimal host bus clock frequency substantially equal to the slowest of the maximum host bus clock frequency ratings of installed processor card(s); and processor configuration circuitry coupled to the at least one processor card slot for establishing an optimized processor core frequency ratio for each installed processor based on the optimal host bus frequency.

10. The multi-processor capable computer system of claim 9, further comprising:

a second communication channel for communicating an original processor core frequency ratio for each processor of installed processor card(s).

11. The multi-processor capable computer system of claim 10, wherein the first and second communication channels comprise a serial scan chain.

12. The multi-processor capable computer system of claim 11, further comprising:

at least one processor card incorporating a plurality of processors installed in the processor slot(s), wherein the first communication channel comprises a first set of switches on each installed processor card(s) for establishing a maximum host bus clock frequency for that processor card, and wherein the second communication channel comprises additional switches on each installed processor card(s), the additional switches providing a processor core frequency ratio setting for each processor of the installed processor card(s).

13. The multi-processor capable computer system of claim 12, wherein each installed processor card further comprises a serial and parallel in, serial out shift register for inserting the settings of the switches into the serial scan chain.

* * * * *